Oct. 22, 1963
E. HABERKORN
3,107,883
FLYING BODY CONSTRUCTION
Filed Dec. 20, 1960
2 Sheets-Sheet 1
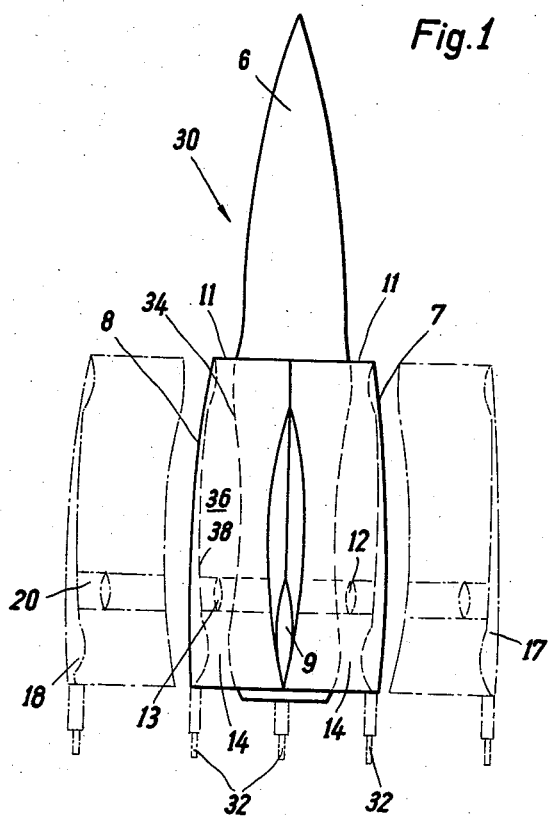
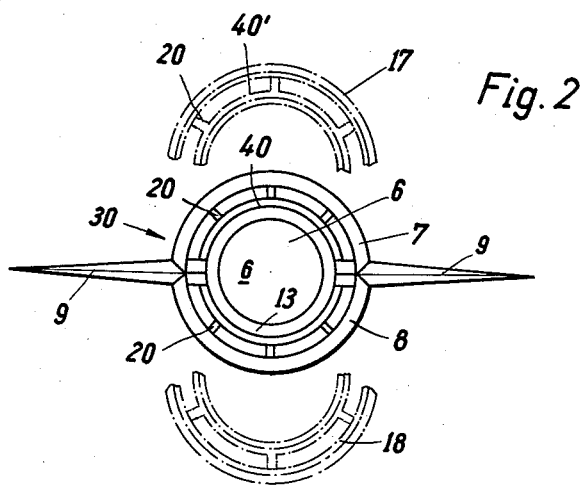

Oct. 22, 1963   E. HABERKORN   3,107,883
FLYING BODY CONSTRUCTION
Filed Dec. 20, 1960
2 Sheets-Sheet 2
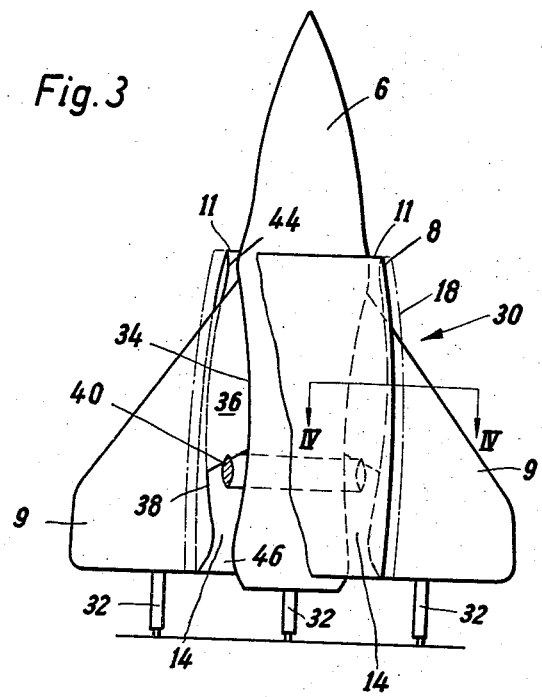
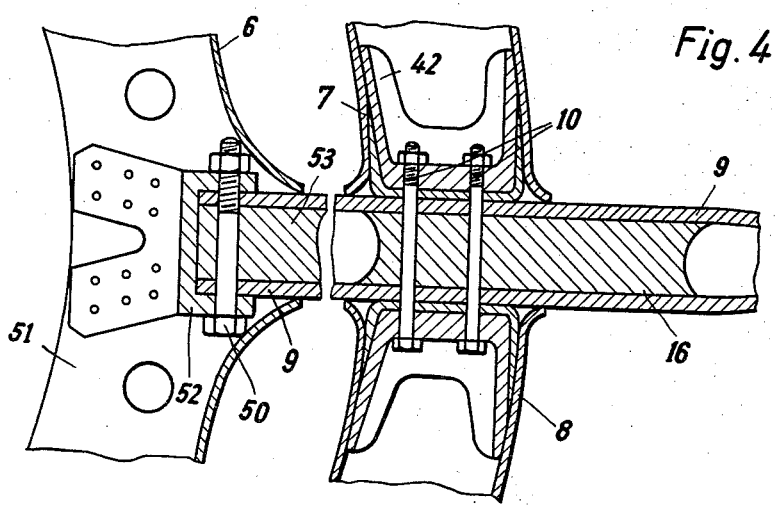
Inventor:
ERICH HABERKORN
McGlew and Toren 3,107,883
FLYING BODY CONSTRUCTION
Erich Haberkorn, Ottobrunn, near Munich, Germany, assignor to Bölkow-Entwicklungen Kommanditgesellschaft, Ottobrunn, near Munich, Germany
Filed Dec. 20, 1960, Ser. No. 77,167
Claims priority, application Germany Dec. 23, 1959
7 Claims. (Cl. 244—15)

This invention relates, in general, to aircraft or flying bodies and, in particular, to a new and useful fuselage and outer body construction for a flying body having a ram-jet engine.

In the designing and developing of aircraft and other flying bodies, it is common practice to determine from the outset the performance characteristics, for example, carrying capacity, load, etc., for which the aircraft is to be used. Once the maximum expected values for these characteristics have been determined, the fuselage and other body portions are designed so as to be able to fulfill and correspond to these characteristics.

A basic consideration in the dimensioning and the arrangement of the body parts is governed by the dimension and power or output capacity of the engine which is to propel the craft. With modern day techniques and advances, it is not uncommon for one phase of the aircraft assembly to advance technicologically at a far faster rate than another portion so that the original planning of the body structures to house the propulsion units becomes outmoded before the production of the originally planned craft is completed. Since the time period between the original planning and the actual production of a flying body is relatively long, the original concepts and ideas are usually outmoded before actual production on the assembly line has taken place. In such instances, it is often necessary to subsequently increase the flying capacities of the present or existing flying bodies.

In order to increase the flying capacities, stronger engines with larger dimensions and greater weight must usually be employed. This, of course, means that the existing body and fuselage and often the complete craft has to be newly designed in order to correspond or withstand the new requirements for capacity.

In accordance with the present invention, there is provided a basic fuselage and outer body construction which may be rapidly assembled together into a finished craft. The construction includes a central fuselage which forms an inner wall of a jet combustion chamber and outer body shell portions which are assembled together on each side of a delta wing construction to form the outer wall of the combustion chamber and complete the overall assembly. The outer body shell portions also contain an annular flame holder or nozzle holder, one portion of which is a semi-annular member secured to one of the shell members by means of radially connecting supporting ribs and the other portion being similarly supported by the opposite shell member. The arrangement is such that the shell members with their annular flame holders are assembled on each side of the delta wing member and bolted to the wing. The flame holders themselves are made so that they extend through openings in the wing permitting opposite half sections to be connected together. An advantage of the construction is that the aircraft may be modified and designed to change the aircraft power plant capacity by changing the diameter of outer body shell portion and its associated flame holder. This may be done by simply unfastening the outer bodies from the delta wing and severing the fuel connections to the flame holder, making a larger opening in the wing to accommodate the enlarged flame holder and thereafter securing a larger diameter outer body shell portion and flame holder to each side of the wing, and reestablishing the fuel connections to the new flame holder.

Thus the inventon makes it possible to equip a flying body basic frame structure with means for permitting it to be used with a much larger power plant and be subject to withstand much higher velocity if such need should ensue.

The invention finds particular application in employment with a ram-jet type engine where it is most usual for the purposes of increasing the thrust performance, to provide for a larger area gas flow for an increased weight of gas flow through the engine.

A feature of the invention is that the central fuselage of the craft including the wing structure may be maintained of uniform design and the outer shells or jacket portions may be interchanged in accordance with the capacity or power of the engine to be employed. It is within the scope of the invention to provide a construction in which either the fuselage or the outer bodies, which together define between them the jet power plant flow area, are exchanged so that this flow area is varied to determine the capacity of the engine. In this manner, it is possible to reconstruct the engine to vary the area ratio in which the propulsion gases act. Thus, the power plant capacity may be increased and utilized on the same basic body design to permit the gaining of additional experience in constructional factors on a body already in existence. A required alteration of the thrust wedge angle on the central body in order to obtain flight at a higher Mach number value is accomplished by exchanging the thrust wedge with ordinary structural elements and means.

In accordance with one advantageous embodiment of the invention, the flying body is shaped in the form of a delta wing airplane having a ram-jet engine which is annularly arranged about the fuselage and whose outer jacket includes a fuel conduit system comprised of two halves which may be separated from each other and from the fuselage. In such a construction the advantages of a ram-jet engine are utilized wherein a small enlargement of the engine cross-section results in a very considerable increase of the thrust capacity. Thus, an increase of the internal diameter of the outer shell portions of about 15%, for example, will mean a doubling of the thrust.

The basic structural frame is made suitable for a wide range of power plant thrusts. The wing size is selected so that it need not be changed for an increase in thrust capacity. Since a larger capacity engine formed by the outer shell body woud obviously be heavier than a smaller thrust engine, a greater amount of fuel must be stored in the bodies and hence the load on the surfaces is increased by the reconstruction. However, such high load stress on the surfaces is permitted due to the increase of velocity.

Accordingly, it is an object of this invention to provide an improved flying body construction.

A further object of this invention is to provide a flying body having a power plant and including means for subsequently and substantially increasing the flying capacity without drastically changing the overall body design.

A further object of the invention is to provide a flying body comprising a fuselage having a lower delta wing construction and including a pair of outer shell body portions which are connected to each side of the wing structure and which together with the fuselage forms an annular combustion space and wherein one or both of the fuselage and outer body shell portions are made exchangeable to vary the capacity of the engine.

A further object of the invention is to provide a flying body having a central fuselage having wing portions extending outwardly from the lower half thereof and having an outer wall shaped to define an inner wall of the power plant combustion chamber, and a pair of removable outer shell body portions connected together on each side of the wing and having interior walls defining the exterior wall of the combustion chamber.

A further object of the invention is to provide a flying body construction which is simple in design, rugged in construction and economical to manufacture.

The various features of novelty which characterize the invention are pointed out with particularity in the claims annexed to and forming part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is an elevational view of a flying body having detachable outer shell portions with the replacement shell portions indicated in dotted line as constructed in accordance with the invention;

FIG. 2 is a top elevation of the flying body indicated in FIG. 1;

FIG. 3 is an elevation similar to FIG. 1 but looking at 90° away therefrom; and

FIG. 4 is a fragmentary horizontal section taken on the line 4—4 of FIG. 3.

Referring to the drawings in particular, the invention embodied therein includes a flying body generally designated 30 which comprises a central fuselage or body 6 having a delta shaped wing with laterally extending portions 9 extending outwardly at diametrically opposite sides thereof adjacent the lower end. The fuselage 6 and the wings 9 are advantageously supported on upstanding supporting members 32.

In accordance with the invention, the fuselage or body portion 6 has a curved outer wall portion 34 which forms an inner annular wall of an annular combustion chamber generally designated 36. The outer wall of the combustion chamber is formed by exchangeable shell members 7 and 8 which fit together on each side of the wing portions 9. The shell members 7 and 8 each have an inner wall 38 which define the outer boundaries of the combustion chamber 36. The outer shell portions 7 and 8 carry complementary semi-annular portions 12 and 13 of an annular flame holder or nozzle holder generally designated 40. As seen from FIG. 1 and FIG. 2, each of the outer shell portions 7 and 8 and their associated flame holders 12 and 13 are detachably connected to the fuselage 6 at the wing portion and may be removed entirely and replaced by larger sized or smaller sized outer shell portions 17 and 18, as desired.

The annular flame holder 40 is supported at a spaced location from the inner wall of the respective outer shell portions 7 and 8 by means of radial webs 20.

Each of the semi-annular outer shell portion and its associated semi-annular flame holder portion are separable in the plane of the wing 9. During the assembly of the flying body, the outer shell portions 7 and 8 are connected together along the wing 9 and are connected to a fuel supply conduit system (not shown) located in the fuselage 6.

As best indicated in FIG. 4, the outer shell portions 7 and 8 are connected to the wing 9 by means of threaded screw bolts 10 which are secured to channel shaped reinforcing flange 42 arranged along the interior edge of each shell portion. A suitable access opening is provided in the shell portion walls for facilitating the assembly of the wing portions thereto. The wing portions themselves are reinforced by a structural member 16 which reinforcing advantageously extends in a direction outwardly from the body 6.

The outer shell portions 7 and 8 are arranged in a manner to effect a small annular air inlet opening 11 between an inner wall 44 thereof and the outer wall 34 of the fuselage. The walls 34 ad 44 diverge toward the center of the combustion chamber 36 at a location 14 of flame ignition and then converge to an annular nozzle portion 46 adjacent the bottom end thereof.

Air entering through the inlet 11 is divided by means of the contouring of the annular flame holder 40 and combustion takes place at the location 14 downstream thereof.

The flying body 30 which, for example, may be designed for flight velocities such as Mach number 4 to 4.5 is capable of developing a velocity of at most 2.5 Mach number if the shell portions 7 and 8 as illustrated in the drawings are used.

In those instances where there is a requirement to increase or decrease the thrust capacity of the engine, the outer jackets 7 and 8 and the flame nozzle holders 12 and 13 and a portion of the fuel conduit system of the engine (not shown) are taken off and replaced by the larger units 17 and 18 with associated nozzle holder 40'. Thus, the engine diameter is somewhat increased as indicated in FIG. 3 by the dotted lines. The replacement jacket shells 17 and 18 are secured to the wing surfaces 9 outside the previous mounting zone which is reinforced by the reinforcing member 16. The member 16 is made sufficiently elongated in order to accommodate this new mounting position.

When replacing shell portions 7 and 8 the attachment of delta wings 9 to the fuselage 6 shown in FIG. 4 need not be loosened. The attachment is achieved by means of threaded screw bolts 50, which are secured to flanges 52 at bulkheads 51 of the fuselage 6 and connected to the inner ends of the delta wings 9 being reinforced at this point by structural members 53.

When the larger sized thrust engine is thus formed, the increase of engine capacity produces flying velocity considerably above the previous engine construction and without rendering it necessary to change the entire construction of the fuselage and associated body parts. In the embodiment indicated, the basic elements, that is, the central fuselage and the rigid wings remain unchanged. Only the diameter of the driving engine combination is slightly increased. To accommodate the larger size flame holder, it is necessary to cut out an enlarged portion of the wings in the region of the combustion chamber 40.

It should be appreciated that the fuselage 6 may be assembled with detachable outer walls in order to vary the dimension of the wall 34 which forms the inner wall of the combustion chamber generally designated 36. In some instances, it may be desirable to vary the capacity of the engine thrust by changing the location of the wall 34 rather than change the location of the wall 38 formed by the interior of the shell members 7 and 8.

While a specific embodiment of the invention has been shown and described in detail to illustrate the application of the invention principles, it will be understood that the invention may be embodied otherwise without departing from such principles.

What is claimed is:

1. A flying craft comprising a central elongated fuselage having outer walls defining an interior wall of an air consuming ram-jet engine combustion chamber, a wing portion extending outwardly from each side of said fuselage in the vicinity of said combustion chamber, a semi-annular shell portion assembly connected to each side of said wing portions, said shell portion assembly including complementary portions of an annular flame holder supported thereby on an interior wall thereof and intermediate the height thereof, said shell portion assembly having an interior wall defining the outer wall of said combustion chamber.

2. A flying body according to claim 1, wherein said wing portions are provided with openings through which portions of said flame holder extend.

3. A flying body according to claim 1, wherein said wing portions are reinforced over a laterally extending area to facilitate interchange of said shell portions from smaller sizes to larger sizes for increasing the capacity of the ram-jet engine.

4. A flying body according to claim 3, wherein said fuselage is disconnectable from said outer shell portion to permit replacement thereof.

5. A flying body comprising a central fuselage having outer walls defining an interior wall of an air consuming power engine combustion chamber, a wing portion extending outwardly from each side of the lower end of said fuselage, exchangeable outer shell portions connected to each side of said wing portions and having an interior wall defining the outer wall of said combustion chamber and a flame holder connected to said outer shell portions and disposed in said combustion chamber to divide the flow path therethrough.

6. A flying body according to claim 5, wherein said wing portion includes a portion cut away in the location of said combustion chamber, said combustion chamber having a narrow nozzle portion at such location.

7. A flying body comprising a central fuselage having outer walls defining an interior wall of an air consuming power engine combustion chamber, wing portions extending laterally outwardly from said fuselage on each side thereof, and an exchangeable outer shell portion having an inner wall at a spaced location from the outer wall of said fuselage to define therewith an air inlet intermediate the length of said fuselage and a combustion chamber between said shell portion and said fuselage, said shell portion comprising at least two parts which are connected to each side of said wing portions.

References Cited in the file of this patent
UNITED STATES PATENTS

| | | |
|---|---|---|
| 2,663,517 | Price | Dec. 22, 1953 |
| 2,958,480 | Saulnier | Nov. 1, 1960 |

FOREIGN PATENTS

| | | |
|---|---|---|
| 1,177,329 | France | Dec. 1, 1958 |